United States Patent [19]

Chesnut

[11] Patent Number: 5,272,316

[45] Date of Patent: Dec. 21, 1993

[54] HEATING APPARATUS FOR USE BY REPTILES OR THE LIKE

[75] Inventor: M. Gaines Chesnut, Golden, Colo.

[73] Assignee: M. Baines Chesnut, Golden, Colo.

[21] Appl. No.: 857,416

[22] Filed: Mar. 26, 1992

[51] Int. Cl.$^5$ ............................................. A01K 31/12
[52] U.S. Cl. ..................... 219/385; 219/521; 219/535; 119/174; 119/28.5; 428/17; 285/330
[58] Field of Search ............... 219/385, 386, 200, 201, 219/535, 521; 119/24, 26, 28.5, 174, 5; 285/330, 421; 403/108, 107; 428/17-27; 362/123, 249, 250; 211/196, 205

[56] References Cited

U.S. PATENT DOCUMENTS

| | | | |
|---|---|---|---|
| D. 175,292 | 8/1955 | Austgen | 119/26 |
| D. 224,686 | 8/1972 | Michlap | 119/28.5 |
| 1,606,354 | 11/1926 | Fillion | 428/18 |
| 2,796,858 | 3/1974 | Cohn | 119/5 |
| 2,839,027 | 6/1958 | Lanza | 119/26 |
| 3,443,827 | 5/1969 | Acker et al. | 285/330 |
| 3,728,202 | 4/1973 | Baus et al. | 428/18 |
| 3,970,834 | 7/1976 | Smith | 362/123 |
| 4,234,780 | 11/1980 | McCarthy | 219/200 |
| 4,318,945 | 3/1982 | Goldman | 119/5 |
| 4,364,685 | 12/1982 | Janz | 403/108 |
| 4,573,102 | 2/1986 | Norwood | 362/123 |
| 4,573,108 | 2/1986 | Castiglia et al. | 362/123 |
| 4,575,132 | 3/1986 | Nattel | 285/421 |
| 4,820,556 | 4/1989 | Goldman et al. | 428/7 |
| 5,018,480 | 5/1991 | Goldman | 119/26 |
| 5,031,572 | 7/1991 | Dana | 119/5 |
| 5,121,709 | 6/1992 | Wechsler | 119/5 |

FOREIGN PATENT DOCUMENTS

| | | | |
|---|---|---|---|
| 204756 | 8/1959 | Austria | 285/421 |
| 3903473 | 8/1989 | Fed. Rep. of Germany | 119/28.5 |
| 1215841 | 11/1959 | France | 403/108 |
| 174009 | 12/1934 | Switzerland | 119/24 |
| 573350 | 11/1945 | United Kingdom | 362/123 |

Primary Examiner—Bruce A. Reynolds
Assistant Examiner—John A. Jeffery
Attorney, Agent, or Firm—Sheridan, Ross & McIntosh

[57] ABSTRACT

A heating apparatus for providing heat and a resting place for reptiles or the like. The heating apparatus includes a housing and a heating device located at a selected level within the interior of the housing. When the reptile rests on an upper surface of the housing and the heating device is activated, heat is conveyed to the upper surface by convection currents. The housing resembles a limb and branches to simulate the natural habitat of the reptile. The limb is held above the bottom surface of the enclosure containing the reptile. The limb is injection molded and includes two body halves that are matingly joined together after the heating device is desirably positioned relative to the body halves. The branches are movable relative to the limb and one of the branches includes a channel for concealing portions of the electrical cord connected to the heating device.

19 Claims, 10 Drawing Sheets

HEATING APPARATUS FOR USE BY REPTILES OR THE LIKE

FIELD OF THE INVENTION

The present invention relates to a heating unit and, in particular, a heating unit for use by reptiles held in captivity.

BACKGROUND OF THE INVENTION

It is commonplace to use certain accessories with terrariums that house reptiles and/or aquariums that contain fish. These accessories include objects that are intended to simulate the natural environment of the reptile or fish. Such objects include plastic foliage, wood pieces, stones or the like. Aquariums also commonly utilize a heater typically having a tube-like shape for heating the water in the aquarium or tank.

An animal rest assembly is disclosed in U.S. Pat. No. 4,234,780 issued Nov. 18, 1980 to McCarthy and entitled "Resting Place for Reptiles in Captivity." The assembly comprises simulated natural rock formed with an uneven surface that rests on the bottom of the enclosure containing the animal. A heater is provided within the body of the assembly and includes a resistive element. A shelf system attached to the inside wall of an aquarium or terrarium using suction devices is described in U.S. Pat. No. 4,820,556 issued Aug. 11, 1989 to Goldman et al. and entitled "Decorative Shelf System for Aquarium or Terrarium." The shelf system may resemble a rock or stone cliff. Columns are preferably provided under the shelves and extend from the bottom surface of the fish tank. U.S. Pat. No. 4,318,945 issued Mar. 9, 1982 to Goldman et al. entitled "Underwater Aquarium Decoration Assembly" illustrates matable pieces for forming a rock-like decorative assembly. The pieces have an outer surface intended to simulate the appearance of rocks.

SUMMARY OF THE INVENTION

In accordance with the present invention, a heating apparatus is provided for use in a vivarium or similar enclosure. The heating apparatus preferably simulates a limb having branches in which the animal or reptile is able to rest on the heated limb in an arboreal manner.

The heating apparatus includes a housing preferably made of body halves that have been injection molded. Each of the body halves includes mating members that are used to join them together. Extender members preferably resembling branches are interconnected with the limb. The branches are movable relative to the limb so that they can be located in a number of different positions. One or more of the branches typically contacts the bottom surface of the enclosure containing the apparatus for supporting the same. One of the branches has a channel that extends along its length for receiving an electrical cord. This arrangement acts to hide, or at least partially conceal, the length of electrical cord that extends along the branch.

The electrical cord is part of a heating device that includes a resistive element electrically communicating with the electrical conducting wire associated with the electrical cord. The resistive element is disposed in the housing using a support assembly affixed to portions of the resistive element. The support assembly preferably includes a number of support elements, each having a table and fingers extending therefrom. The resistive element is disposed or threaded through the fingers. The support assembly is joined to level units formed along the inside surface of the housing. The level units enable the heating device to be assembled within the housing at different positions relative to the upper surface of the limb. In one embodiment, the resistive element is movable after assembly so that the position thereof can be adjusted as desired. In another embodiment, a photoelectric detector is included for use in controlling the resistive element. That is, depending upon the amount of light sensed, the detector controls whether the resistive element is on or not.

Based on the foregoing summary, a number of salient features of the present invention are readily discerned. A heating apparatus is provided in a terrarium that simulates elements found in the natural habitat of the animal being held in captivity. In a preferred embodiment, the heating apparatus has a housing in the form of a tree limb and branches whose appearance is able to conform to the usual environment that the animal, reptile or the like is accustomed to. The limb or body of the heating apparatus is elevated or located above the bottom surface of the terrarium to provide a heated resting place above surface level that is apparently preferred by the reptile since it simulates its natural environment. The limb has a base member for providing a stabilizing support. The simulated branches are used in supporting the limb or body of the heating apparatus above the enclosure bottom surface. The branches are adjustable relative to the limb so that they can be located at a selected one of a number of different positions. One of the branches has a channel for receiving portions of the electrical cord of the heating device for concealing the same. The heating device is locatable at different positions within the interior of the limb. In another embodiment, the positioning of the heating device can be controlled to directly affect the surface temperature. In still another embodiment, a photoelectric detector is used to turn heating device(s) on/off thus controlling the temperature generated by the heating device(s) to achieve day/night variance. The housing parts for enclosing the heating device are preferably injection molded to facilitate manufacture thereof. Such parts are also readily assembled together, including positioning and location of the heating device within the interior of a limb or housing.

Additional advantages of the present invention will become readily apparent from the following discussion, particularly when taken in conjunction with the accompanying drawings.

DETAILED DESCRIPTION

Figure 1:
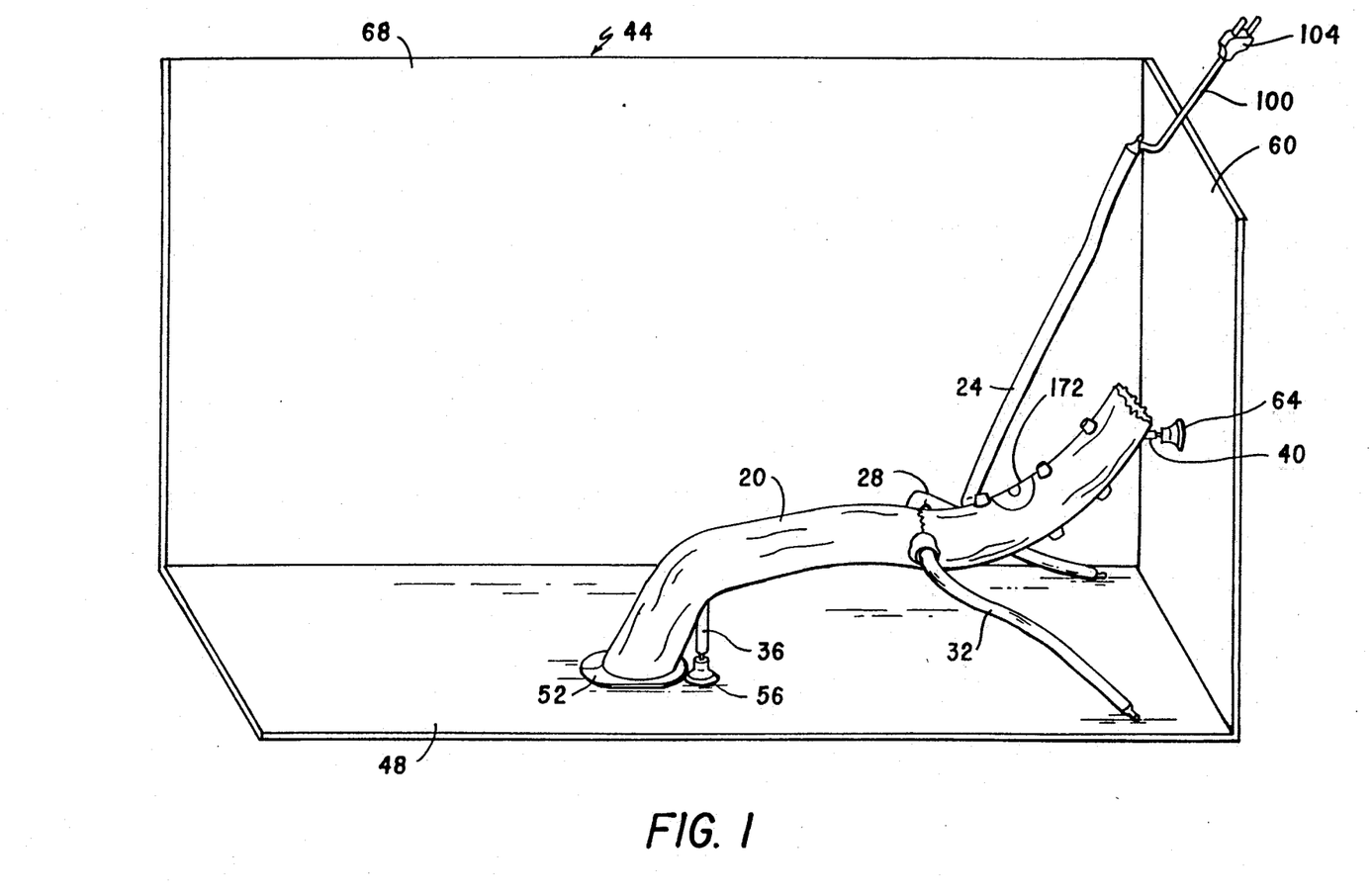
FIG. 1 is perspective view of the heating apparatus simulating a limb and branches located in an enclosure such as a terrarium.

With reference to FIG. 1, an apparatus for providing heat, as well as support, to an animal, such as a lizard, held in captivity as illustrated. The apparatus preferably simulates a tree limb having branches. In particular, the apparatus includes a body 20 having a length with curves or undulations that simulate a tree limb. Connected to the limb 20 are a number of extender members. In the preferred embodiment, the extender members simulate branches extending from the limb 20. In the embodiment illustrated, there are a first branch 24, a second branch 28 and a third branch 32. Also extending from the limb 20 are two support poles 36, 40. The apparatus is located within an enclosure 44, such as a terrarium, for holding an animal, such as a reptile or the like, in captivity while simulating a tree limb having branches that resemble natural surroundings that the animal would be accustomed to. In that regard, in simulating the natural habitat, a substantial majority of the length of the body 20 is raised or supported above a bottom surface 48 of the enclosure 44. The lizard is thereby able to rest on and be supported by an upper outer surface of the limb 20 above the bottom surface 48. In providing this support, the limb 20 has a base member 52 formed at one end thereof with the base member 52 contacting the bottom surface 48 of the enclosure 44 to assist in stabilizing the apparatus within the enclosure 44. The base member 52 preferably has screw size hole(s) which can be used, if desired, to attach it to the bottom floor 48, or to a cover at the top surface 44. Adjacent to the base member 52 is a first support pole 36. This extends from the bottom outer surface of the limb towards the bottom surface 48 of the enclosure 44. The first support pole 36 has a tapered end for receiving a first suction cup 56 that may optionally engage the bottom surface 48 for use in further holding the apparatus in place. At the opposite end of the limb 20, the second support pole 40 extends laterally towards a sidewall 60 of the enclosure 44. The second support pole 40 also has a tapered end for receiving a second suction cup 64 that may optionally engage the sidewall 60 and provide additional support at this end of the limb 20. Further stabilizing support for the apparatus is provided by the second and third branches 28, 32 that extend outwardly from the limb 20 and have their ends contact the bottom surface 48 of the enclosure 44 to also assist in the support of the main trunk area of the limb 20. Alternatively, these branches can be used upwardly to allow the creature to climb toward the vivarium top. The first branch 24 generally extends upwardly away from the bottom surface 48 towards a back wall 68 of the enclosure 44. The first branch 24 can also act as a support of the apparatus against the back wall 68. It should be understood that the branches need not be positioned as illustrated in FIG. 1 but each can be moved to a desired one of a variety of positions, as will be described later. In fact, the "power cord" branch can go downward in cases where it is desirable to take the cord out the bottom, or it can simply come out of the limb bottom.

Figure 2:
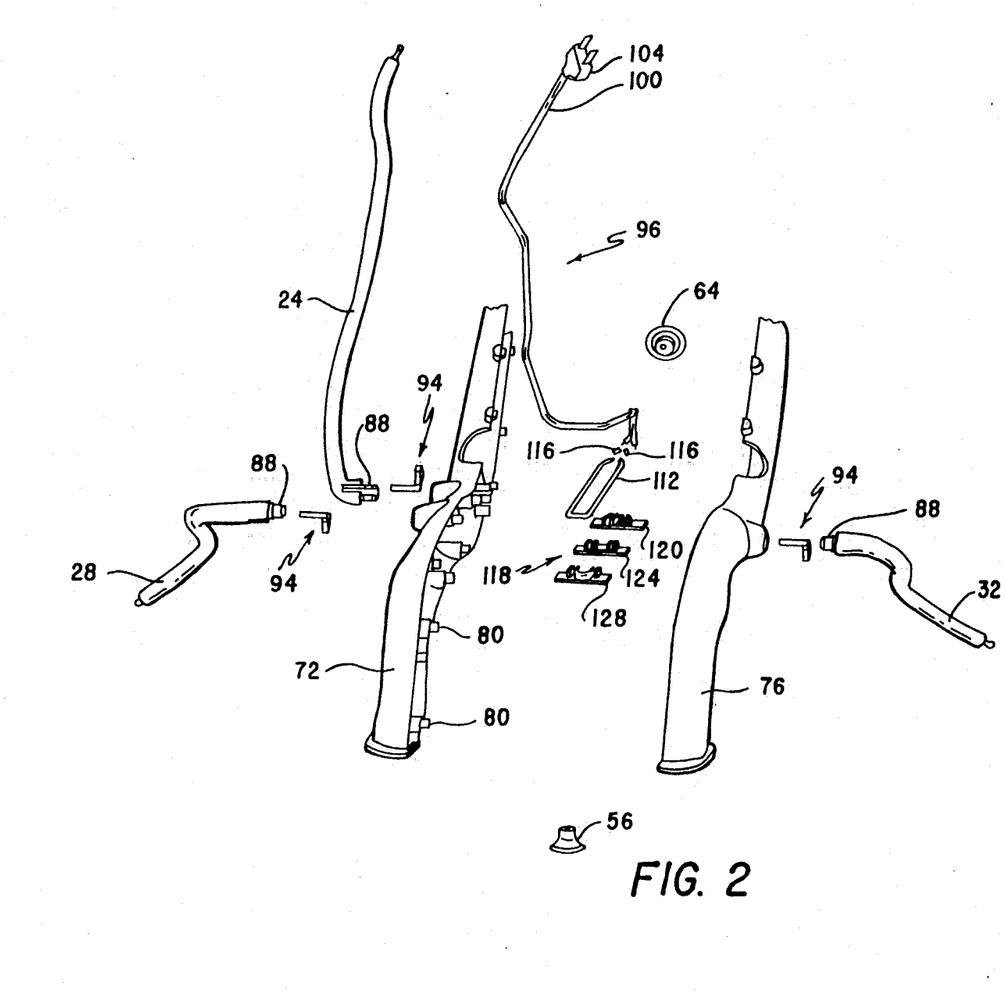
FIG. 2 is an exploded, perspective view of the various parts of the heating apparatus.

Referring now to FIG. 2, a detailed description of the various parts of the heating apparatus is provided. The body 20 includes first and second body halves 72, 76. The two body halves are matingly joined together using male and female members. The first body half 72 has a number of male members that project from an inner surface thereof. The female members 84 are formed in the inner surface of the second body half 76 and are aligned for mating engagement with respective ones of the male members 80. The male and female members 80, 84 are advantageously spaced along the length of the limb 20 to provide a desired tight connection between the two body halves. In the preferred embodiment, each of the two body halves 72, 76 is made by an injection molding process using a lightweight and relatively inexpensive plastic material. Although shown as left and right halves, it is to be understood that another embodiment could be up and down halves or "offset" parting lines.

Figure 3:
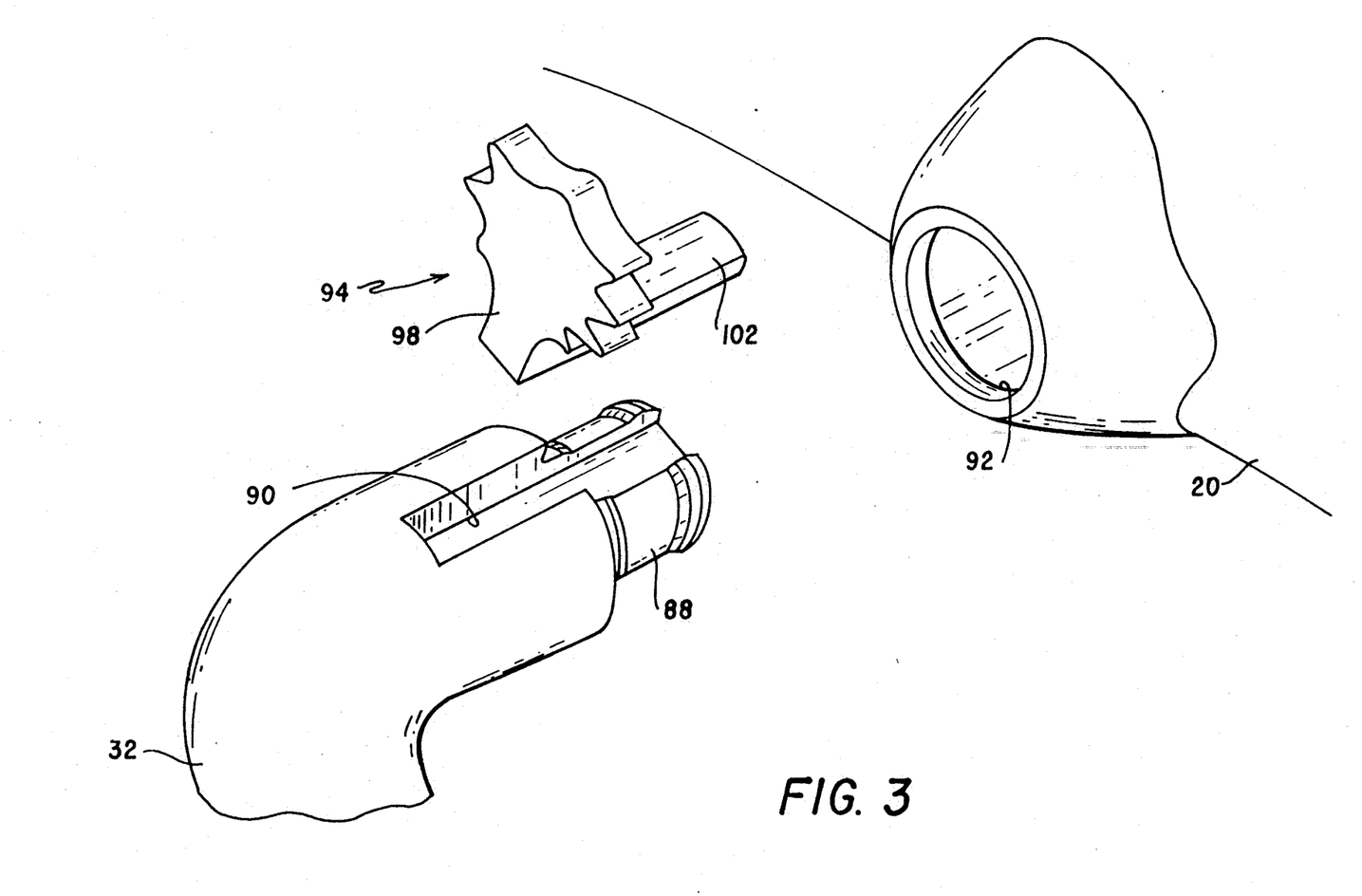
FIG. 3 is an enlarged exploded view illustrating the branch stem and wedge member for positioning in the limb hole.
Figure 4:
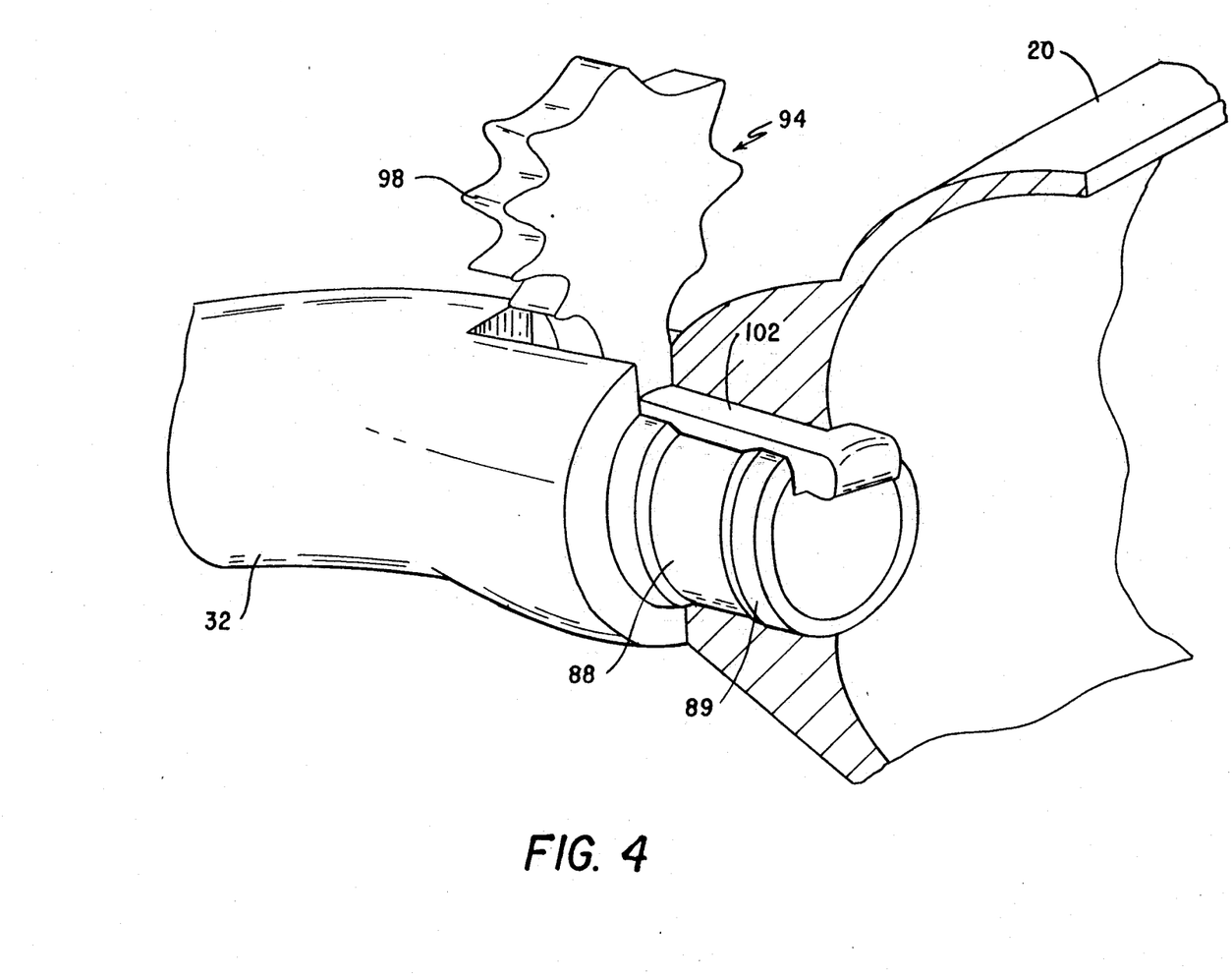
FIG. 4 is an enlarged, vertical cross-sectional view illustrating a branch connected to a limb in a selected position using the wedge member.

With reference to FIGS. 3 and 4, as well as continued reference to FIG. 2, each of the branches 24, 28, 32 is connected to the limb 20 using a female/male type connection. Each of the branches includes a stem at the end of the branch that is connected to the limb 20. As seen in FIGS. 3 and 4, the branch 32 has a stem 88 that is received in a hole 92 formed in the limb 20. A slot 90 is formed in the stem 88. A wedge member 94 is used to fixedly maintain the branch 32 in a selected position relative to the limb 20. The wedge member 94 includes a body piece 98 and a foot wedge 102. In one embodiment, the body piece 98 may have a shape that simulates a leaf, but need not have this shape. The foot 102 preferably has a tapered thickness on an annular cross-section to match the hole 92 with the greater thickness being relatively farther away from the free end of the foot 102. As seen in FIG. 4, the foot 102 is located in the slot 90. This is done, after the selected position of the branch 32 relative to the limb 20 has been made. In that regard, the stem 88 is inserted into the limb hole 92 and, after insertion, a snapping action occurs whereby the stem 88 is held in the hole 92 using a lip 89 of the stem 88. The lip 89 has a greater diameter than other portions of the stem 88. The branch can then be rotated to a desired position. The foot 102 is then positioned within the hole 92. After the foot 102 is positioned in the limb hole 92, the foot 102 acts as a frictional wedge between the stem 88 and the inside surface of the limb hole 92 to hold the branch 32 and its stem 88 in a rotational position with respect to the limb 20. In order to change the position of the branch 32, the wedge member 94 is retracted outward by pulling on the body piece 98 to thereby back the foot 102 away from its rotationally wedged position. After doing so, the branch 32 is free to rotate relative to the limb 20 to a new selected angular position and the wedge member 94 can then again be pushed forward to interconnect the limb 20 and the branch 32 in a frictional interference manner.

Figures 5, 6:
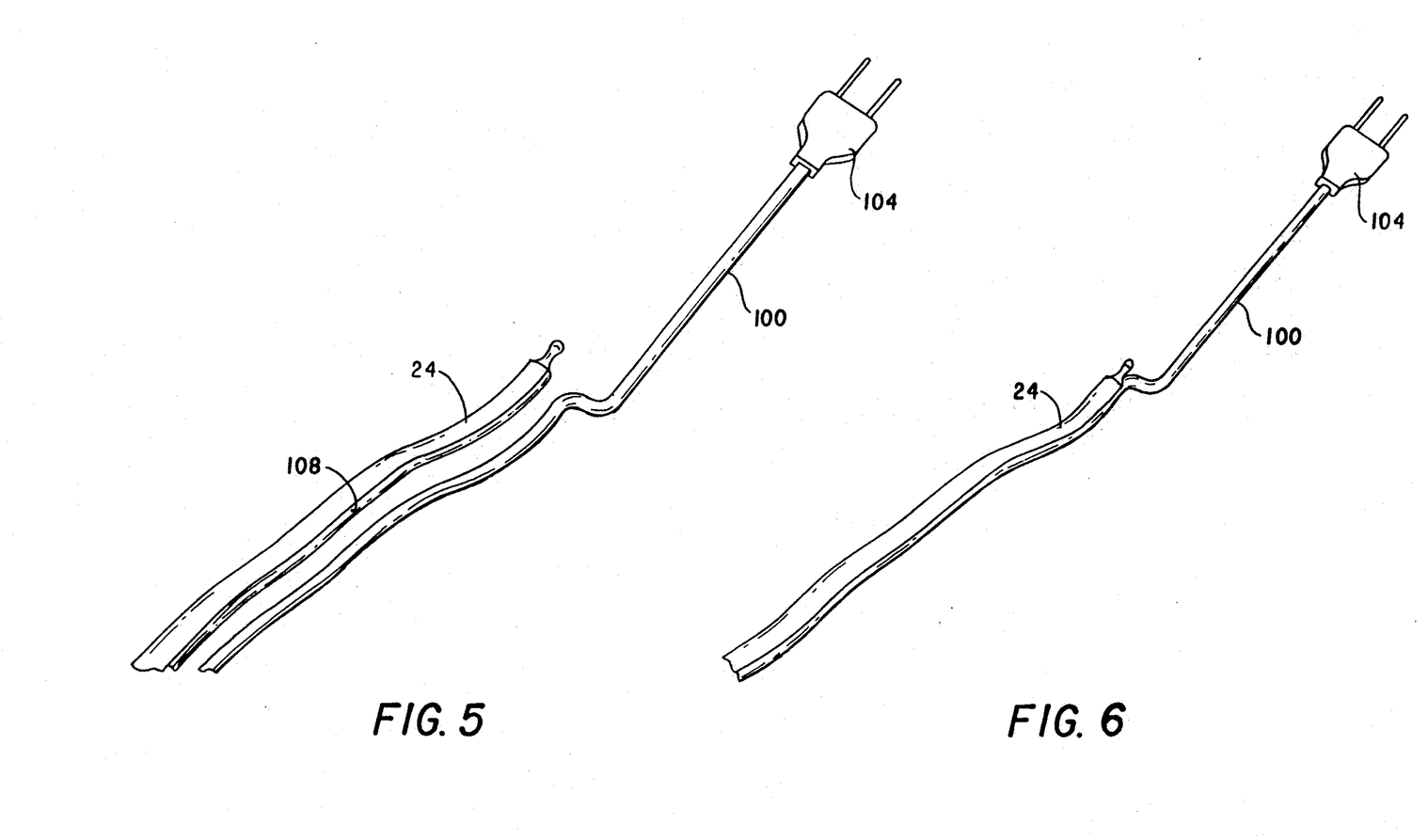
FIG. 5 is an enlarged exploded view illustrating portions of the electrical cord for positioning in the branch channel.
FIG. 6 is an enlarged, perspective view of a branch illustrating portions of the electrical cord of the heating device located in a branch channel.

As also seen in FIG. 2, the apparatus includes a heating device, which has portions positioned within the body 20 prior to joining the body halves 72, 76 together. The heating device 96 includes an electrical cord 100 having an electrical plug 104 at one end for connection to an electrical outlet. As seen in FIG. 5, the first branch 24 includes a channel formed along the length thereof which defines a hollow elongated area of a size for receiving significant portions of the length of the electrical cord 100. After positioning portions of the electrical cord 100 into the channel 108, these portions are concealed or at least partially hidden from view so that a more desirable appearance or look is achieved by not having most of the electrical cord exposed within the enclosure 44. This concealment is illustrated best in FIG. 6, which illustrates the portions of the electrical cord 100 disposed within the channel 108 of the first branch 24.

Figure 7:
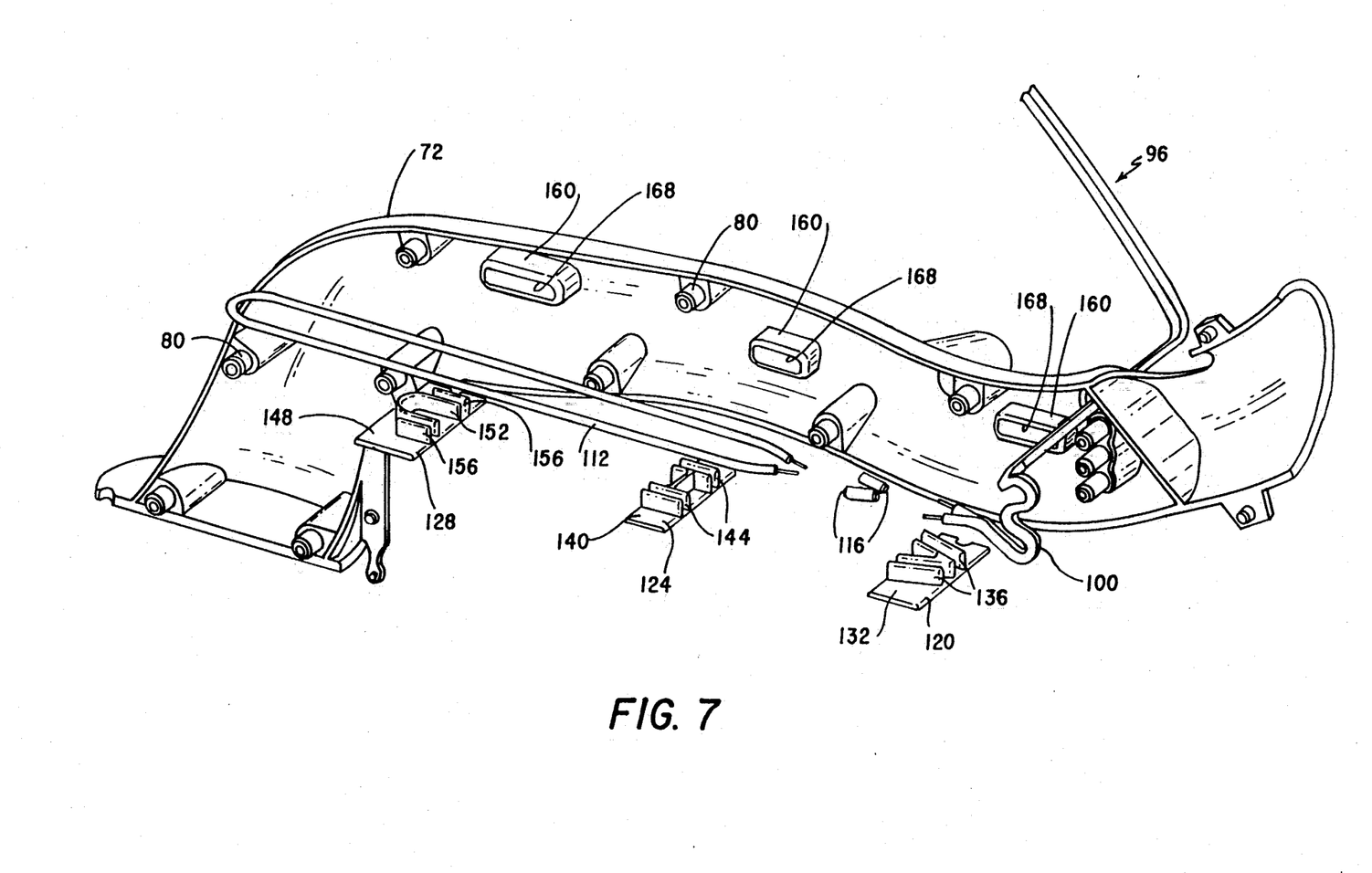
FIG. 7 is an enlarged, exploded view illustrating the heating device for positioning in one of the body halves.
Figure 8:
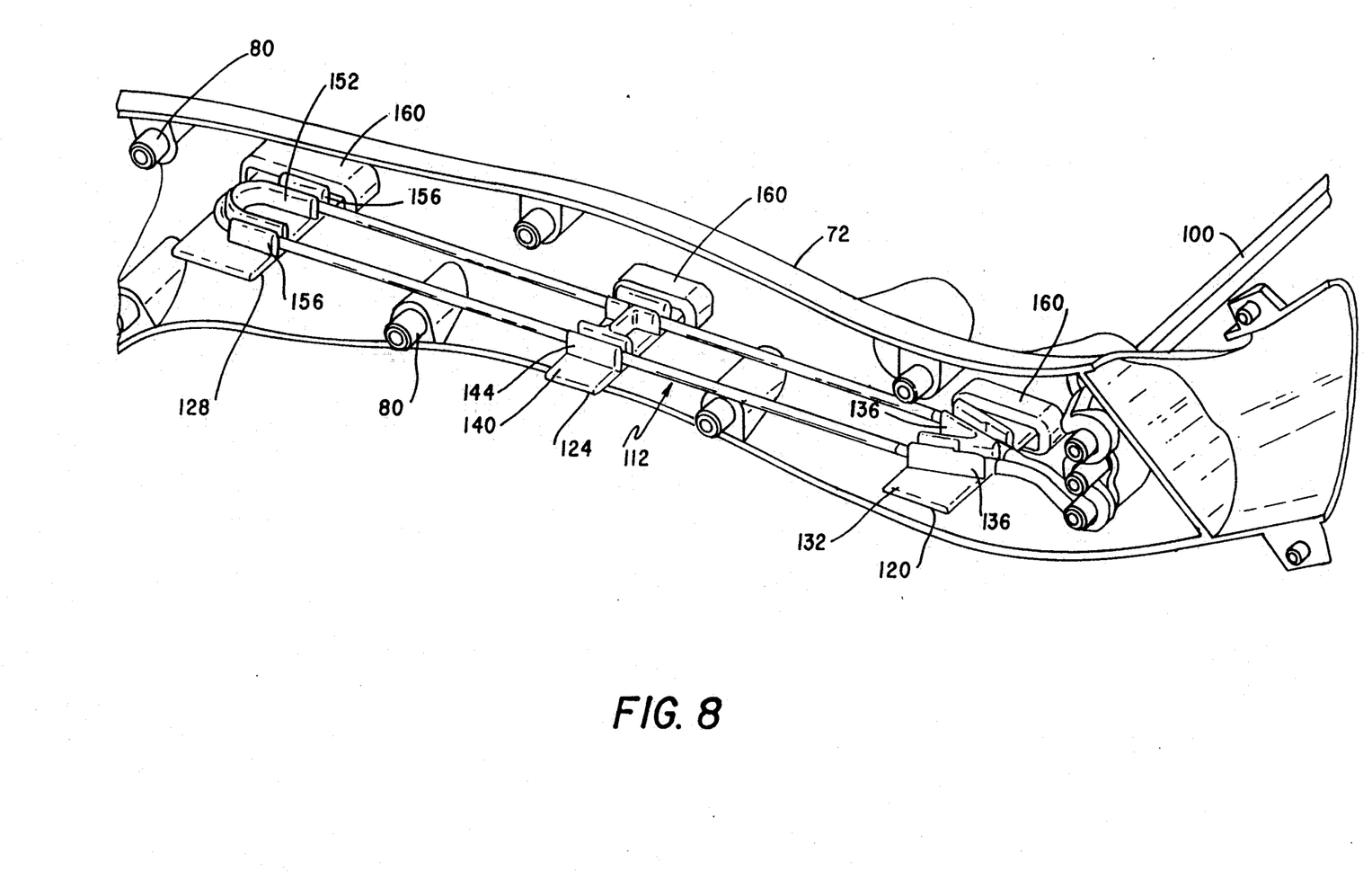
FIG. 8 is an enlarged longitudinal section illustrating the heating device including the support assembly for use in holding the resistive element and locating the same within the interior of the limb.
Figure 9:
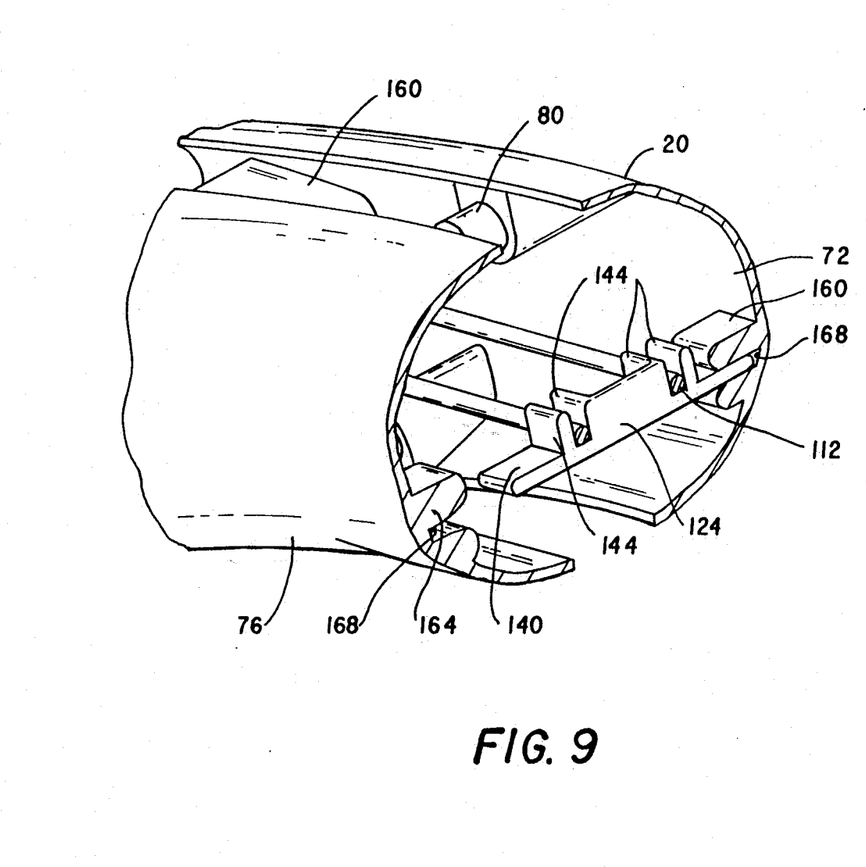
FIG. 9 is a vertical cross section through the limb illustrating the heating device held within the interior of the limb.

With continued reference to FIG. 2, as well as FIGS. 7-9, the heating device 96 further includes a heater or resistive element 112 having a predetermined resistance for generating desired heat due to current flow through the heater element 112. The heater element 112 is configured in the shape of a loop with the ends thereof being connected to the electrical cord 100 using crimping sleeves 116, or by soldering or welding.

In order to position the resistive element 112 within the body 20, a support assembly 118 is utilized. Preferably, the support assembly 118 includes a number of support units 120, 124, 128, but may possibly have a single support or mounting board. These support units are separate from the main body 20 and therefore inherently include the feature that they can be made (molded) using a higher thermally resistant material than the base body material. The support unit 120 has a table 132 and inclined fingers 136 that extend therefrom. The inclined fingers 136 are arranged in two pairs with each one of the conducting cord wires of the electrical cord 100 being inserted between one of the two pairs. As can be seen in FIG. 8, the conducting wires of the electrical cord 100 diverge from each other to electrically connect to the heater element loop 112 using the fingers 136. The second support unit 124 also has a table 140 and fingers 144 projecting outwardly therefrom. The fingers 144 are arranged in two pairs with each pair having one conducting wire of the resistive element loop 112 being inserted therebetween in order to hold and guide the heater element 112. The third support unit 128 has a table 148 and an arcuate member 152 with fingers 156 located outwardly of the sides of the arcuate member 152. The end of the heater element loop 112 is positioned about the outer surface of the arcuate member 152 with the two conducting wires of the resistive element loop 112 being located between the fingers 156 and the sides of the arcuate member 152. The arcuate member 152 allows resistance loop length to vary slightly and still be supported since it takes into account tolerances in loop cutting length. In order to tightly hold the heater element 112 and accommodate the length of the resistive element loop 112 including taking up any slack associated therewith, there is a desired spacing between the fingers or the fingers and the arcuate member for achieving these objectives.

With regard to connecting the heater element 112 together with the support assembly to the body halves 72, 76, a number of holding units or receptacles 160 are integrally formed with each of first and second body halves 72, 76. As seen in FIG. 7, three holding units 160 are provided along the inner side surface of the first body half 72. Corresponding and aligned holding units 164 are found on the second body half 76 with one of the these holding units 164 being shown in FIG. 9. Each of the holding units 160, 164 has a cavity 168 for receiving portions of the tables 132, 140, 148 of the respective support units 120, 124, 128 for holding the support units within the hollow interior of the body 20 in a desired position. The location of the holding units 160, 164 along the inner wall surfaces of the body halves 72, 76 is predetermined to desirably position the heater element 112 relative to the upper or top surface of the body 20. The closer that the heater element 112 is to the upper surface of the body 20, the greater the amount of heat that will be received by the upper surface of the limb 20, which can be felt by the animal when it is resting on the upper surface. As can be appreciated, a number of levels of holding units could be formed along the inner wall surfaces. When the heating apparatus is assembled, the support assembly together with the heater element 112 can be held by the selected level of the plurality of levels of holding units 160, 164. If a relatively greater amount of heat is desired at the upper surface, the support assembly and the heater element 112 would be located in a level of holding units 160, 164 that are located relatively closer to the upper surface. Conversely, for relatively less heat conveyed to the upper surface, the support assembly and the heater element 112 would be located in a level of holding units 160, 164 that are relatively farther away from the upper surface. As should be understood also, the resistive element 112 is typically spaced from the upper surface of the body 20 and heat generated by the resistive element, by means of electrical current flowing therethrough, is conveyed to the upper surface by convection. However, it should be apparent to those skilled in the art that if more heat is desired to be placed onto a given surface, conductive attachment clips can be made to touch the support members as well as the selected area and thus transmit more heat as compared to air convection.

Figure 10:
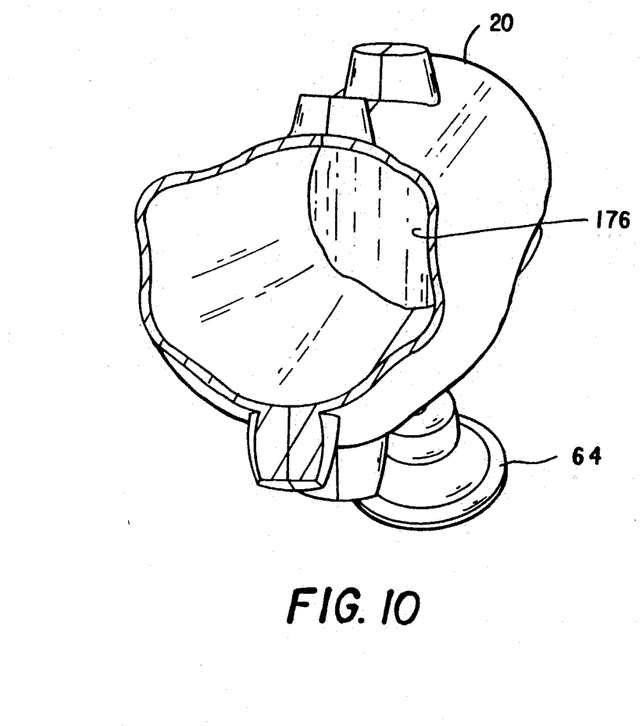
FIG. 10 is a greatly enlarged, fragmentary, perspective view illustrating the tunnel formed in the limb.

With reference to FIG. 10, as well as FIGS. 1 and 2, the limb 20 also includes an access opening 172 formed in the upper surface of the body 20. The access opening 172 is of a size to permit the animal held in captivity, such as a reptile, to enter the access opening 172 and move into a tunnel 176, as seen in FIG. 10. The tunnel 176 is a hollow interior portion of the body 20 and extends from the access opening to one of the free ends of the limb 20, which is illustrated in FIG. 1 as having jagged edges. By means of the access opening 172 and the tunnel 176, the heating apparatus further simulates a hollow tree element that permits a reptile to rest, hide or move through the tunnel and thereby further resemble its natural habitat.

Figure 11:
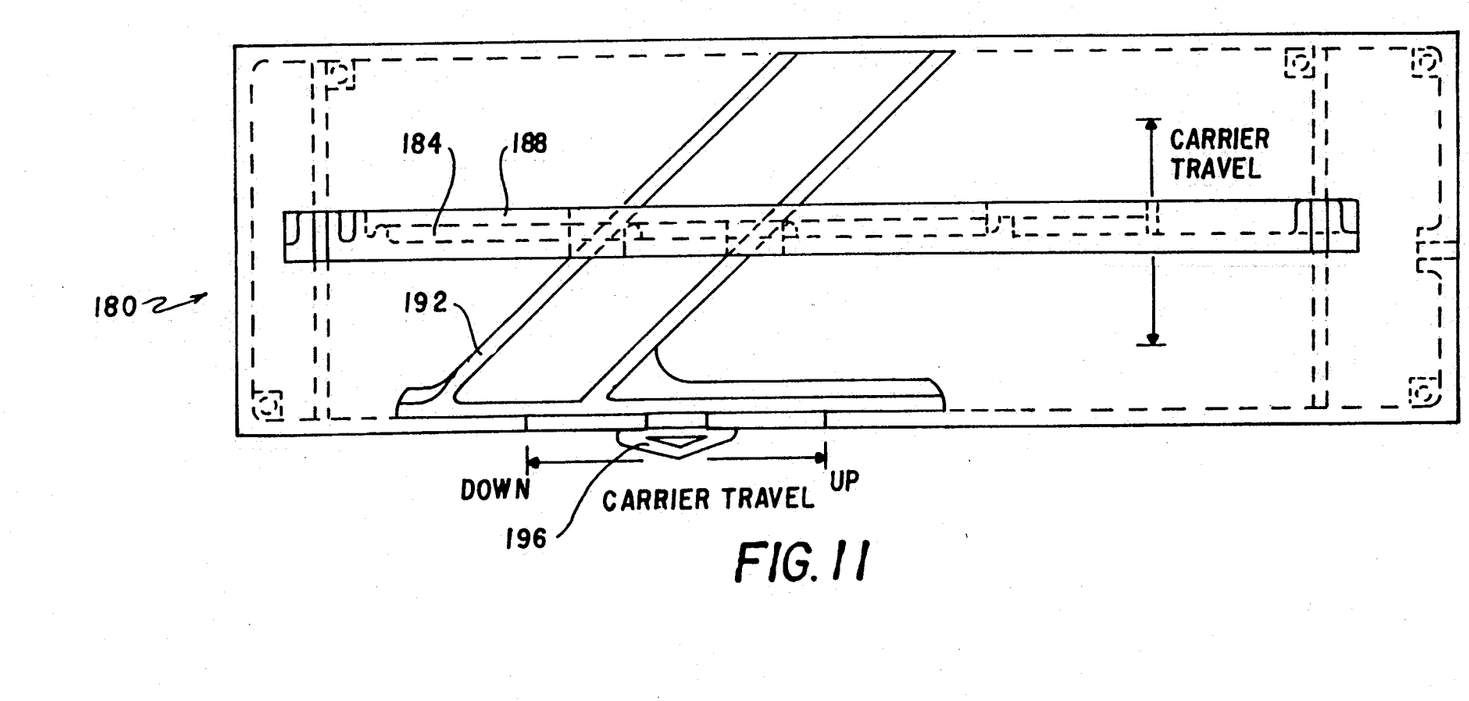
FIG. 11 is an elevated lateral section of another embodiment illustrating an assembly for controlling the position of the heating device in the limb.

In another embodiment, a device is provided to allow for adjustment of heat that is conveyed by air convection currents to the upper surface of the limb 20. With reference to FIG. 11, a temperature adjusting device 180 is illustrated for moving a heater element 184 relative to the upper surface of the limb. The heater element 184 is disposed in a frame 188 that is movable towards and away from the upper surface of the limb 20 using a carrier slide 192. The carrier slide 192 has ramping surfaces along which the frame 188 is movable in a substantially vertical direction relative to the upper surface of the limb. The carrier slide 192 has a handle 196 that is accessible by the user to cause desired movement of the heater element 184. To move the heater element 184 and the frame 188 closer to the upper surface of the limb, with reference to FIG. 11, the handle 196 is moved towards the right thereby ramping the heater element 184 upwardly as the carrier slide 192 is moved in a rightward direction. Similarly, moving the handle 196 and the carrier slide 192 in a leftward direction causes the heater element 184 and its frame 188 to move downwardly or away from the upper surface of the heater element. Hence, for relatively greater heat to be conveyed to the upper surface, the carrier slide 192 and the handle 196 are positioned in a relatively more rightward direction while relatively less heat is conveyed to the upper surface of the limb by positioning the carrier slide 192 and its handle 196 more towards the left side. As can be appreciated, a number of different configurations could be utilized for moving the heater element 184 relative to the upper surface of the limb.

In yet another embodiment, a thermostat controlled heating device could be utilized whereby different levels of surface temperature are generated by the same heater element, depending upon the thermostat setting. In such a case, the thermostat would control the amount of electrical current supplied to a resistive wire and thus heat to the upper surface of the limb as opposed to positioning of the heater element relative to the upper surface.

Figure 12:
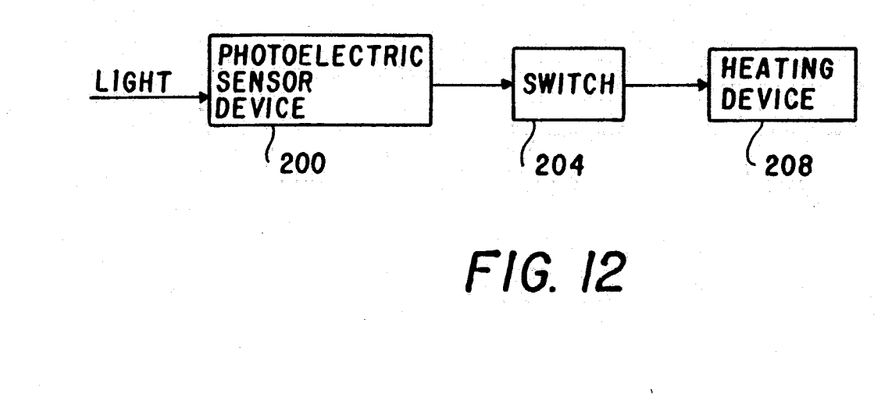
FIG. 12 is a block diagram illustrating a photoelectric assembly for controlling the temperature of the heating device.

With reference to FIG. 12, another temperature controlling feature is disclosed. The illustrated apparatus automatically controls the application of heat to the limb, depending upon whether it is daytime when light is present or nighttime when substantially no light is present. Because reptiles are cold-blooded animals, it may be useful to provide a desired amount of heat to the limb during nighttime hours. However, during the daylight hours, the level of automatic supplying of the desired heat should be changed. To implement this feature, the heating apparatus includes a photoelectric sensor device 200 for detecting whether or not a predetermined amount of light is present. If the predetermined amount of light is not present, a signal is generated by the photoelectric sensor device 200 for controlling a switch 204. The switch 204 can be configured to either close or open thereby controlling a heating device 208 or a plurality of such heaters in parallel. For example, the switch 204 could close upon receiving the signal from the photoelectric sensor 200 indicating that substantially no light is present. The closure of the switch 204 thereby causing electric current to flow through the heating device 208 to generate heat therein and have the heat conveyed by air convection currents to the upper surface of the limb.

The foregoing discussion of the invention has been presented for purposes of illustration and description. Further, the description is not intended to limit the invention to the form disclosed herein. Consequently, variations and modifications commensurate with the above teachings, within the skill and knowledge of the relevant art, are within the scope of the present invention. The embodiment described hereinabove is further intended to explain the best mode presently known of practicing the invention and to enable others skilled in the art to utilize the invention in such, or other embodiments, and with the various modification required by their particular application or uses of the invention. It is intended that the appended claims be construed to include alternative embodiments to the extent permitted by the prior art.

What is claimed is:

1. An apparatus for heating a reptile or the like in captivity using an enclosure having a bottom surface, comprising:

housing means resembling an object found in nature, said housing means including body means and extender means joined to said body means, said body means having a length and an outer surface and said body means being elevated above the enclosure bottom surface along which the reptile or the like is above to move, said extender means including a wedge member for holding remaining portions of said extender means to said body means in a selected one of a plurality of different positions; and a heating device having a length and a width with said length being substantially greater than said width, said length of said heating device extending in substantially the same direction as said length of said body means, and when said heating device is activated, heat emanates outwardly from said heating device along a majority of said length thereof, the heat increasing a temperature of said outer surface of said body means with a majority of the heat to said outer surface provided using said majority of said length of said heating device.

2. An apparatus as claimed in claim 1, wherein:
   said extender means includes a number of separate pieces and at least one of said pieces contacts the enclosure bottom surface.

3. An apparatus as claimed in claim 1, wherein:
   said body means and said extender means together resemble a tree limb having at least one branch.

4. An apparatus as claimed in claim 1, wherein:
   said extender means has a width being defined substantially by a diameter and said body means has a width substantially defined by a diameter and said extender means diameter is less than one-half the diameter of said diameter of said body means.

5. An apparatus as claimed in claim 1, wherein:
   said extender means includes at least two branches located at different positions along said body means and at least one of said branches contacts the surface for use in supporting said body means above the enclosure bottom surface.

6. An apparatus as claimed in claim 1, wherein:
   said body means includes first and second separate mating members joined together using attaching means, each of said first and second mating members is injection molded with portions of said attaching means.

7. An apparatus as claimed in claim 1, wherein:
   said wedge member includes a foot, said extender means includes a stem having a slot, and said body means includes a hole with said foot being positionable in said slot and said stem being located in said hole.

8. An apparatus as claimed in claim 1, wherein:
   said body means includes an inner surface having a plurality of holding units for receiving portions of said heating device.

9. An apparatus as claimed in claim 1, wherein:
   said body means includes a tunnel having a floor whereby the reptile or the like is above to contact said floor and move through said tunnel.

10. An apparatus as claimed in claim 1, wherein:

said heating device includes a heater element spaced from an inner surface of said body means wherein an air space is defined between said inner surface of said body means and said heater element whereby said inner surface is heated by convection of heat from said heater element.

11. An apparatus as claimed in claim 10, wherein:
said heater element includes a resistive element for conducting electricity, said resistive element having a predetermined resistance for generating heat.

12. An apparatus as claimed in claim 1, wherein:
said heating device includes means for adjusting the temperature of said heating device, said means for adjusting including means disposed outwardly of said body means for accessing in order to adjust the temperature.

13. An apparatus, as claimed in claim 1, further including:
means for automatically adjusting the temperature of said heating device.

14. An apparatus, as claimed in claim 13, wherein:
said means for automatically adjusting includes photoelectric means for detecting light with the amount of said light detected being used in automatically adjusting said heating device.

15. An apparatus, as claimed in claim 1, wherein:
said heating device is substantially free of emanated light.

16. An apparatus for heating a reptile or the like held in captivity using an enclosure having a bottom surface, comprising:
housing means resembling an object found in nature, said housing means including body means and extender means joined to said body means, said body means being elevated above the enclosure bottom surface along which the reptile or the like is able to move, said body means including first and second separate mating members joined together using attaching means, each of said first and second mating members having an exterior surface and an interior surface, with said interior surface being hidden after said first and second mating members are joined together;
heating means disposed in said housing means for providing heat to said body means;
a plurality of holding means integrally formed by injection molding with said interior surface of at least one of said first and second mating members, said plurality of holding means being spaced apart along a length of said body means; and
a support assembly separate from but connected to said plurality of holding means, said support assembly contacting said heating means for supporting the same at a desired position in said body means, said support assembly and at least a first of said plurality of holding means being matingly joined together, with one of said first holding means and said support assembly having a first cavity for receiving portions of the other thereof.

17. An apparatus, for heating a reptile or the like held in captivity using an enclosure having a bottom surface, comprising:
housing means including body means and extender means joined to said body means, said body means being elevated above the enclosure bottom surface along which the reptile or the like is above to move, said body means resembling a tree limb and said extender means resembling at least one tree branch, said body means including first and second separate mating members joined together using a plurality of attaching means, each of said first and second mating members including an exterior surface and an interior surface in which each of said interior surfaces is hidden when said first and second mating members are jointed together, each of said plurality of attaching means being integrally formed with said interior surface when said first and second mating members are injection molded, said plurality of said attaching means being spaced throughout a length of each of said first and second mating members, and wherein each of said attaching means of said first mating member being able to be joined to only a corresponding one attaching means of said second mating member; and
heating means disposed in said housing means for providing heat to said body means.

18. An apparatus for heating a reptile or the like held in captivity using an enclosure having a bottom surface, comprising:
housing means resembling an object found in nature, said housing means including body means and extender means joined to said body means, said body means being elevated above the enclosure bottom surface along which the reptile or the like is able to move; and
a heating device disposed in said body means for providing heat to said body means, said heating device including a heater element spaced from an inner surface of said body means wherein an air space is defined between said inner surface of said body means and said heater element whereby said inner surface is heated by convection of heat from said heater element, said heating device including support means for receiving portions of said heater element, said support means being disposed within said body means and said heater element being variably positioned using said support means, said support means including a carrier slide having at least a first ramping surface and a handle connected to said carrier slide, said heater element including a frame and wherein said heater element is movable along said first ramping surface of said carrier slide by movement of said handle.

19. An apparatus as claimed in claim 18, wherein:
each of said plurality of support means includes a base and at least one guide member extending from said base, said guide member for receiving portions of said heater element.

* * * * *